United States Patent [19]
Day

[11] 3,792,547
[45] Feb. 19, 1974

[54] DEVICE FOR ELECTRICALLY EXTERMINATING RODENTS

[75] Inventor: Leon E. Day, Memphis, Tenn.
[73] Assignee: C. F. Easley, Millington, Tenn.
[22] Filed: Apr. 14, 1972
[21] Appl. No.: 244,215

[52] U.S. Cl. .................................................. 43/98
[51] Int. Cl. ........................................ H01m 19/00
[58] Field of Search ................... 43/98; 119/53, 61

[56] References Cited
UNITED STATES PATENTS
3,197,916  8/1965  Cole, Jr. et al. ..................... 43/98
2,969,769  1/1961  Paschall ............................. 119/53

Primary Examiner—Louis G. Mancene
Assistant Examiner—J. Q. Lever
Attorney, Agent, or Firm—John R. Walker, III

[57] ABSTRACT

The subject device includes a housing having suitable bait placed therein. A plurality of apertures are provided in the lower portion of the housing for allowing the passage outwardly of the aroma of the bait and also providing passageways which the rodent is obligated to attempt to pass through in his endeavor to get to the bait. However, the passageways are purposely designed to be sligthly smaller than the head of the rodent intended to be exterminated. Therefore, the rodent must engage the housing adjacent the passageways when endeavoring to get to the bait. An electrode is connected to a voltage source and is suspended within the housing adjacent the passageways. Therefore, since the housing is also connected to the voltage source, a voltage potential exists between the structure thereof defining the passageways and the electrode. Accordingly, as the rodent endeavors to get to the bait, his head engages the structure having the voltage potential thereon which sends a lethal charge of electricity through his head. Structure is included for varying the size of the passageways or for allowing the rodent to expand a small passageway to a size which will accommodate enough of his head to allow him to simultaneously engage the internal electrode and the housing.

3 Claims, 3 Drawing Figures

PATENTED FEB 19 1974　3,792,547

DEVICE FOR ELECTRICALLY EXTERMINATING RODENTS

BACKGROUND OF THE INVENTION

1. Field of the Invention:

This invention relates to rodent exterminators and is particularly directed towards electrical rodent exterminators.

2. Description of the Prior Art:

Electrical rat exterminators per se are not new. In fact, such devices have been in existence for at least forty years as evidenced by the Kaiser U.S. Pat. No. 1,899,199. It will be noted that the '199 patent depends upon the rodent entering the housing structure and is electrocuted when the feet of the rodent simultaneously engage grid structure having voltage potential thereon. Certain disadvantages prevail in an arrangement such as the '199 patent: First, the carcass of the rodent remains in the housing creating an unpleasant task of the removal thereof. Secondly, requiring the rodent to contact the electrodes with his feet to receive the lethal charge of electricity requires a relatively high voltage for exterminating the rodent. Thirdly, the rodent must enter the housing prior to being exterminated. Many rodents, particularly a well-fed rodent, would be reluctant to enter the housing, i. e., they probably would extend their heads into the opening and go no further, thus avoiding extermination.

A preliminary patentability search revealed the above-mentioned '199 patent and the following U. S. patents: Cole, Jr., et al, Pat. No. 3,197,916; Levine Pat. No. 3,388,497; and 3,468,054. None of the above references show or suggest applicant's device. It should be noted that none of the above listed disadvantages pertaining to the '199 patent have been obviated by any of the latter-mentioned patents.

SUMMARY OF THE INVENTION

The present invention is directed towards overcoming the disadvantages and problems relative to previous devices for electrically exterminating rodents. The concept of the present invention is: First, attract the rodent to the device. Secondly, deliver a lethal charge of electricity to the rodent without requiring him to enter a housing or the like. Thirdly, deliver the lethal charge of electricity to the brain of the rodent, thus requiring a relatively low voltage, e. g., 115 volts AC or the like. Fourthly, provide structure which may be actuated or adjusted by the rodent to assure that different size rodents adequately contact the structure having the voltage potential thereon.

The device of the present invention includes a housing having suitable bait placed therein. A plurality of apertures are provided in the lower portion of the housing, allowing the passage outwardly of the aroma of the bait, and also providing passageways which the rodent is obligated to attempt to pass through in his endeavor to get to the bait. However, the passageways are purposely sized to be slightly smaller than the head of the rodent intended for extermination. Therefore, the rodent must engage the housing adjacent the passageways when endeavoring to get to the bait. An electrode is connected to a voltage source and is suspended within the housing adjacent the passageways. Therefore, since the housing is also connected to the voltage source, a voltage potential exists between the structure defining the passageways and the electrode. Accordingly, as the rodent endeavors to get to the bait, his head engages the structure having the voltage potential thereon which sends a lethal charge of electricity through his head. Structure is included for varying the size of the passageways for allowing the rodent to expand a small passageway to a size which will accommodate enough of his head to allow him to simultaneously engage the internal electrode and the housing.

DESCRIPTION OF THE PREFERRED EMBODIMENT

Figure 3:
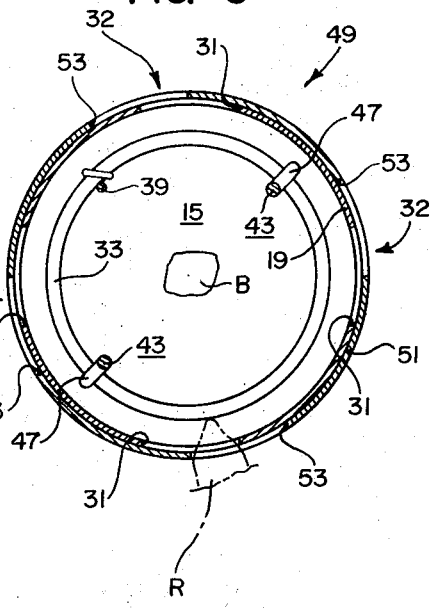
FIG. 3 is a sectional view taken as on the line III—III of FIG. 2.

The device 11 of the present invention is for electrically exterminating a rodent R (his head only being shown in FIG. 3) and includes a housing 13 preferably formed from sheet metal or the like. The housing 13 includes a floor 15, a cover 17, and a wall 19. The wall 19 preferably includes a flange member 21 and the cover 17 preferably includes a flange member 23. The flange members 21, 23 are provided with a plurality of aligned apertures 25 for respectively receiving a like number of bolt-nuts 27 for removably securing the cover 17 to the housing 13. A handle 29 is suitably attached to the cover 17 for carrying the device 11 from one place to another.

Suitable bait B, for baiting the device 11, is positioned on the floor 15 of the housing 13. The wall 19 is provided with a plurality of apertures 31 which are positioned in the lower portion thereof for allowing the passage outwardly of the aroma of the bait B and also providing passageways 32 into the interior of the housing 13 through which it is anticipated the rodent R will attempt to pass his head in a manner yet to be described.

Included is a first electrode 33 which is positioned within the housing 13 with portions thereof being adjacent to or obstructing the passageways 32. Also included is a second electrode 35 which may optionally constitute the housing 13 or a part thereof. In other words, the housing 13 may optionally be formed from a non-conductive substance, e.g., plastic or the like, in which case the second electrode 35 would be metallic structure or the lower part of housing 13 and defining at least part of the passageways 32 or apertures 31.

Also included is electrical means 37 leading from a suitable source of electricity, not shown, and having first and second conductors 39, 41 included therewith. The first conductor 39 is attached to the first electrode 33 as by soldering or the like, and the second conductor 41 is attached to the second electrode 35 or the housing 13 as by soldering or the like. Accordingly, the rodent R is electrocuted by a lethal charge of electricity from the electrical means 37 as he simultaneously contacts the first electrode 33 and the second electrode 35 while placing his head into one of the passageways 32 in his endeavor to get to the bait B.

The first electrode 33 is electrically isolated from the housing 13 in any well known manner. However, I prefer to use a plurality of insulated electrode support members 43 formed from plastic or the like. The upper ends of the support members 43 are fixedly attached to the cover 17 in any well known manner, as by rivets 45 or the like and extend downwardly into the housing 13 a predetermined distance so as to support the electrode 33 adjacent the passageways 32. The lower part of the support members 43 respectively include eye-portions 47 for circumferentially engaging and supporting the electrode 33.

Figure 1:
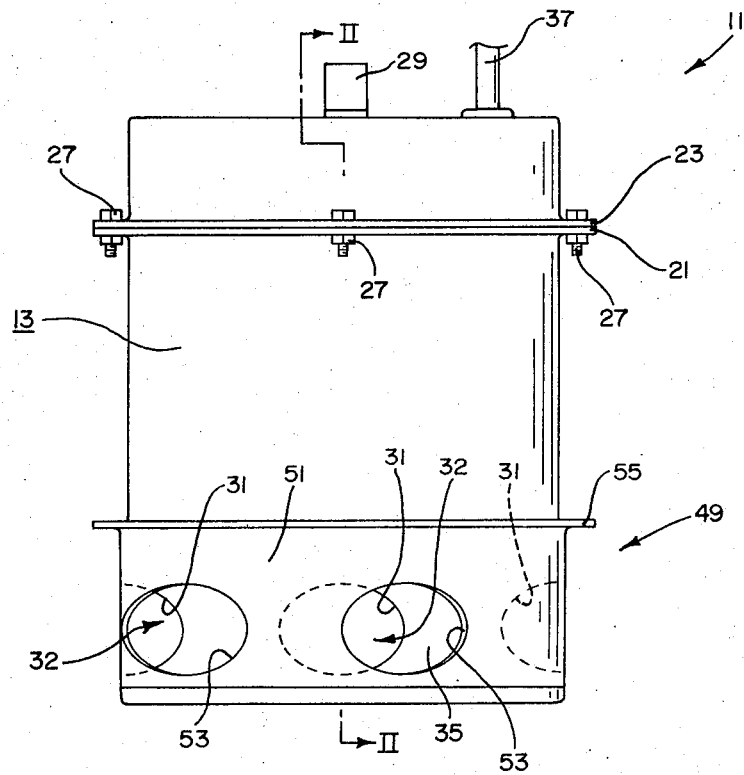
FIG. 1 is a side elevational view of the device of the present invention for electrically exterminating rodents.
Figure 2:
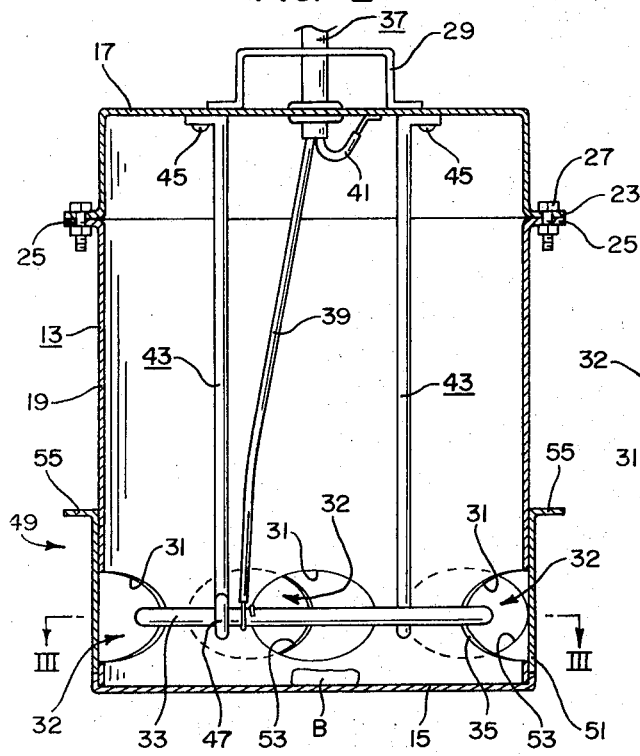
FIG. 2 is a sectional view taken as on the line II—II of FIG. 1.

The device 11 includes means 49 for varying the size of the passageways 32. The housing 13 preferably has a cylindrical shape thereto and the means 49 includes a circular band 51 which contiguously engages the wall 19 adjacent the apertures 31. The band 51 is provided with a plurality of apertures 53 which may be aligned with the apertures 31 for reasons yet to be disclosed. In this regard, I prefer that the apertures 31, 51 be elongated and positioned so that the major axes thereof are substantially as depicted in FIGS. 1 and 2 of the drawings, i.e., extending along a circumference of the wall 19.

The band 51 includes a flange member 55 adjacent the upper edge thereof. The band 51 is free to rotate about a vertical axis for aligning and misaligning the apertures 51 thereof with the apertures 31. When setting the device 11, the user places the bait B on the floor 15 and, by gripping the flange member 55, the band 51 is rotated to a position which reduces the size of the passageways 32 to a size which will enable the rodent R to just get his nose through. It should be pointed out that the passageways 32 have their largest size when the apertures 51 are aligned with the apertures 31 and diminish in size as the degree of misalignment is increased. The rodent R urges the band 51 to rotate as he eagerly forces his way through the passageway 32. In this manner, the passageway 32 is increased in size to accommodate various size rodents while still assuring that the rodent maintains contact with the second electrode 35 or the housing 13 until he simultaneously touches the first electrode 33 which causes his extermination in a manner previously described.

Although the invention has been described and illustrated with respect to a preferred embodiment thereof, it is to be understood that it is not to be so limited since changes and modifications may be made therein which are within the full intended scope of the invention.

I claim:

1. A device for electrically exterminating a rodent comprising housing means including a wall, bait means positioned within said housing means, said wall having a plurality of apertures provided in the lower portion thereof for allowing the passage outwardly of the aroma of said bait means and providing passageways into the interior of said housing which the rodent may attempt to pass through, each of said passageways having a size smaller than the head of the rodent to be exterminated, and electrical means including first and second conductors and having first and second electrode means insulated one from the other, said first electrode means being disposed within said housing means with portions thereof partially obstructing said passageways, said second electrode means defining at least in part said passageways, said first conductor being attached to said first electrode means and said second conductor being attached to said second electrode means for electrocuting the rodent as he simultaneously contacts said first and second electrode means while placing the forward portion of his head into one of said passageways in his endeavor to get to said bait means.

2. The device of claim 1 in which is included means for varying the size of said passageways.

3. A device for electrically exterminating a rodent comprising housing means including a circular wall, bait means positioned within said housing means, said wall having a plurality of apertures provided in the lower portion thereof for allowing the passage outwardly of the aroma of said bait means and providing passageways into the interior of said housing means which the rodent may attempt to pass through, each of said passageways having a size smaller than the head of the rodent to be exterminated, electrical means including first and second conductors having first and second electrode means insulated one from the other, said first electrode means being disposed within said housing means with portions thereof partially obstructing said passageways, said second electrode means defining at least in part said passageways, said first conductor being attached to said first electrode means and said second conductor being attached to said second electrode means for electrocuting the rodent as he simultaneously contacts said first and second electrode means while placing the forward portion of his head into one of said passageways in his endeavor to get to said bait means, and a circular band for varying the size of said passageways said circular band contiguously engaging said circular wall adjacent said apertures therein, said band being provided with a plurality of apertures which may respectively be aligned with said apertures in said wall, said band being free to rotate about a vertical axis for aligning and misaligning said apertures therein with said apertures in said wall, said passageways having their largest size when said apertures in said band are aligned with said apertures in said wall and diminishing in size as the degree of misalignment is increased.

* * * * *